US007082505B2

(12) United States Patent
Chen

(10) Patent No.: US 7,082,505 B2
(45) Date of Patent: Jul. 25, 2006

(54) BACKUP DATA MECHANISM WITH FUZZY LOGIC

(75) Inventor: Nan-Jung Chen, Kaohsiung (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 554 days.

(21) Appl. No.: 10/286,208

(22) Filed: Nov. 1, 2002

(65) Prior Publication Data

US 2004/0088506 A1    May 6, 2004

(51) Int. Cl.
  G06F 12/02    (2006.01)
(52) U.S. Cl. .................. 711/161; 711/162; 707/204
(58) Field of Classification Search ............. 711/162, 711/161; 707/204
  See application file for complete search history.

(56) References Cited

U.S. PATENT DOCUMENTS 6,163,773 A     12/2000   Kishi .................. 706/16
  2003/0177149 A1*  9/2003   Coombs ............... 707/204

OTHER PUBLICATIONS

"Adaptive Disk Striping for Parallel Input/Output," Simitci et al., 16th IEEE Symposium on Storage Systems, 1999, Mar. 1999, San Diego, CA, pp. 88-102 (1-15).
"Xmas: An Extensible Main-Memory Storage System for High-Performance Applications," Park et al., Proceedings of ACM Sigmod Conference, pp. 578-580, Jun. 1998.
"High Speed On-Line Backup When Using Logical Log Operations," Lomet et al., Proceedings of ACM Sigmod Conference, Dallas, TX, May 2000.
"SUMPY: A Fuzzy Software Agent," Song et al., Proceedings of the ISCA Conference on Intelligent Systems, Reno Nevada, Jun. 1996, pp. 1-11.

* cited by examiner

*Primary Examiner*—Mano Padmanabhan
*Assistant Examiner*—Midys Rojas
(74) *Attorney, Agent, or Firm*—Haynes and Boone, LLP

(57) ABSTRACT

A data archiving controller automatically determines a whether a main storage devices has usage ratio in excess of a maximum limit and if an archiving or backing storage device has sufficient directory space to accept files from the main storage devices. The data archiving controller then determines using fuzzy logic the number of files to be transferred from the main storage devices to the backing storage devices. The data archiving controller has a set allocating apparatus in communication with the main storage device and the backing storage devices to receive retention device usage parameters for classification within classification sets. A membership rules retaining device contains the classification parameter defining rules by which the retention device usage parameters are assigned to the classification sets. The archiving controller has a rule evaluation apparatus for determining a quantity of data to be archived. The quantity of data to be archived is based on evaluation rules determined by the classification sets. A data designation apparatus designates the number of files to be archived and then designates the files to be transferred between the main storage device and backing storage devices.

56 Claims, 6 Drawing Sheets

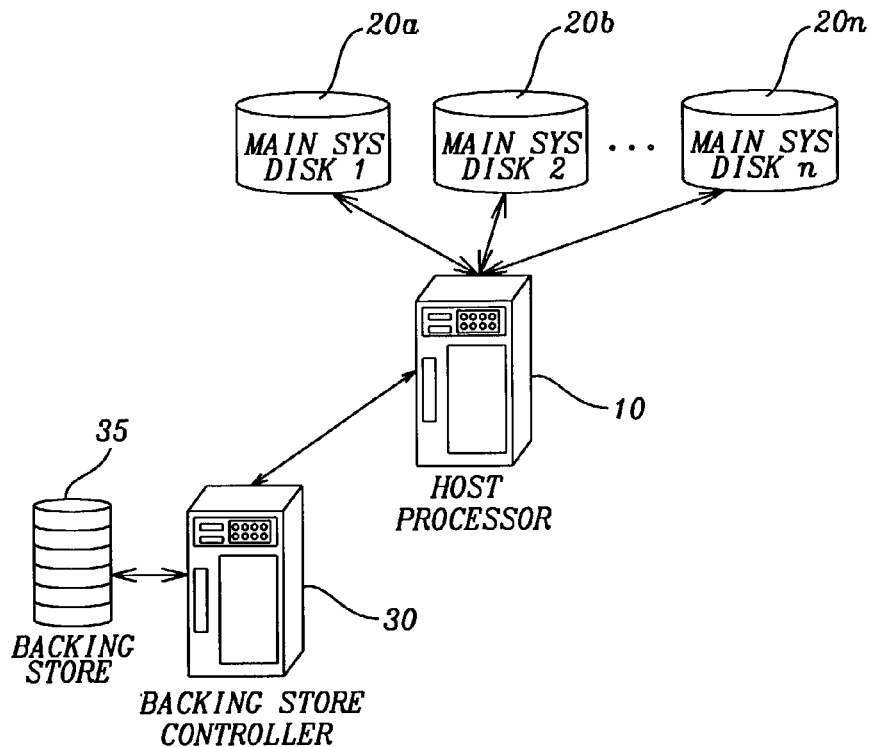
FIG. 1 – Prior Art
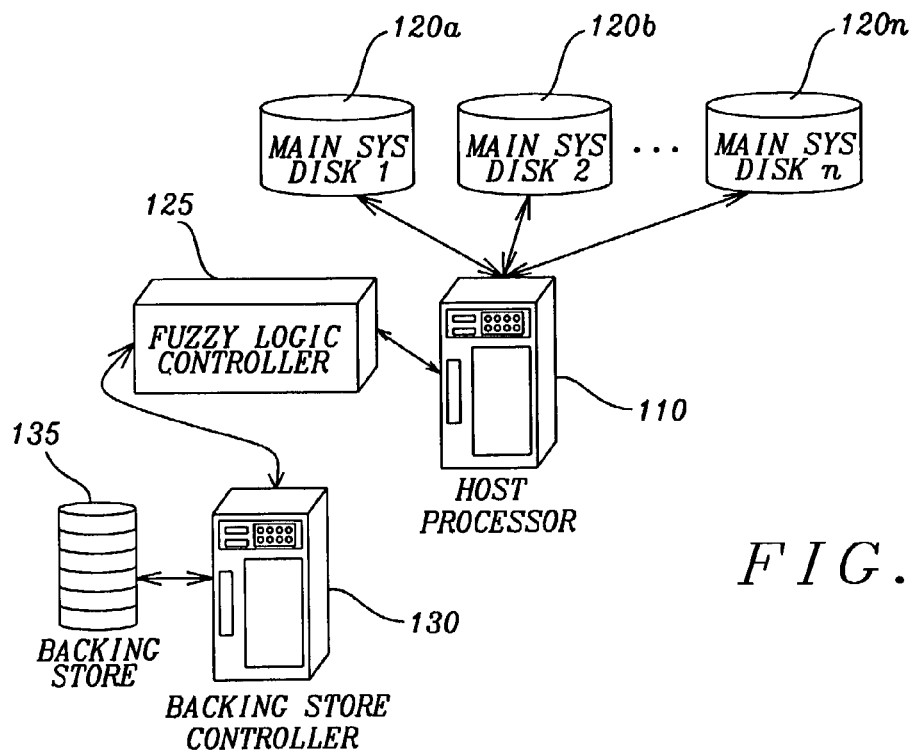
FIG. 2

BACKUP DATA MECHANISM WITH FUZZY LOGIC

BACKGROUND OF THE INVENTION

1. Field of the Invention

This invention relates to computer data storage systems. More particularly, this invention relates to archiving or backup systems for computer data storage systems.

2. Description of Related Art

Computer data storage systems such as storage area networks are well known in the art. Fundamentally, as shown in FIG. 1, a main processor or server computer 10 will have at least one main system disk 20a, 20b, ..., 20n for storing or retaining non-volatile data. As data is created, it is stored on at least one of the disks 20a, 20b, ..., 20n. In the prior art there is no automatic archiving of the data when the amount of data stored within the main storage disks 20a, 20b, ..., 20n approaches the capacity of the main storage disks 20a, 20b, ..., 20n. If the disks 20a, 20b, ..., 20n reach capacity, the main processor may perform inadequately or even fail. Further is there is no notification to the user-owner of the data files when the quantity of data files present on the main storage disk 20a, 20b, ..., 20n exceed the limit that allows efficient operation of the main processor 10. The operator or the user-owner of the disk is then forced to manually extract excess files from the main storage disks 20a, 20b, ..., 20n and transfer the excess files through the backing storage controller 30 to the backing storage disks 35.

Generally, the user owner of the files present on the main storage disks 20a, 20b. .., 20n is assigned storage directories on the backing storage disks 35. The owner then extracts the excess data files from the main storage disks 20a, 20b, ..., 20n and places these excess files within the backing storage disks 35.

The backing store controller 30 normally provides the assignment of the directories within the backing storage disks 35 upon request, but does not provide notification if the assigned directories are nearing their assigned capacity. If the user-owner requests archiving of data files from the main storage disks 20a, 20b, ..., 20n to directories of the backing storage disks 35 and the directories have insufficient space to accommodate the data files, the user-owner must request additional space within the directories or additional directories on the backing storage disks 35. The lack of automatic notification or automatic storage of files causes an increase in time and resources to prevent failure of the main processor 10 because of the main storage disks 20a, 20b, ..., 20n have become full and have no additional space for storage of the data files.

U.S. Pat. No. 6,163,773 (Kishi) describes a data storage system where a cache is managed by a predictive cache management engine. The cache management engine evaluates cache contents and purges entries unlikely to receive sufficient future cache hits. The engine includes a single output back propagation neural network that is trained in response to various event triggers. The cache management engine operates the trained neural network to generate scores for cached data sets, these scores ranking the data sets relative to each other. The cache management engine reviews the scores, identifies one or more data sets with the least scores, and purges the identified data sets from the cache.

"Adaptive disk striping for parallel input/output," Simitci, et al., 16th IEEE Symposium on Storage Systems, 1999, March 1999, San Diego, Calif., pp. 88–102, describes a fuzzy logic rule base for adaptive, redundant striping of files across multiple disks. This rule base is based on a queuing model of disk contention that includes file request sizes and disk hardware parameters. At low loads, the rule base stripes aggressively to minimize response time. As loads rise, it stripes less aggressively to maximize aggregate throughput.

"Xmas: An Extensible Main-Memory Storage System for High-Performance Applications," Park, et al. Proceedings of ACM SIGMOD Conference, pp. 578–580, June 1998, describes Xmas, which is an extensible main-memory storage system for high-performance embedded database applications. The Xmas system utilizes "fuzzy checkpointing" to insure data concurrency within the storage system.

"High Speed On-line Backup When Using Logical Log Operations," Lomet, Proceedings of ACM SIGMOD Conference, Dallas, Tex., May, 2000, describes a "full speed" backup system that is loosely coupled to the cache manager, and hence similar to current on-line backups, but effective for general logical log operations. "Fuzzy dumps" and "fuzzy checkpointing" are discussed for maintenance of data concurrency.

"SUMPY: A Fuzzy Software Agent" Song, et al., Proceedings of the ISCA Conference on Intelligent Systems, Reno Nev., June 1996. describes a software agent "living" in and helping to maintain a UNIX file system for better disk space utilization by compressing and backing up. Built using subsumption architecture, SUMPY displays a "plug and play" property. A new UNIX maintenance task can be added to SUMPY's repertoire without modification of existing layers. One layer of the software agent has a fuzzy control mechanism enabling it to achieve its goals in a real-world manner. The fuzzy controller decides whether a certain file in a particular user directory should be compressed or not. This decision is influenced by a series of input values coming from a set of sensors.

SUMMARY OF THE INVENTION

An object of this invention is to provide a data archiving controller which automatically determines a whether a main storage devices has a quantity of data files stored in excess of a maximum quantity.

Another object of this invention is to provide a data archiving controller to automatically determine if an archiving or backing storage device has sufficient directory space to accept files that are in excess of the quantity allowed in the main storage devices.

Further, another object of this invention is to determine, using fuzzy logic, the number of files to be transferred from the main storage devices to the backing storage devices.

To accomplish at least one of these objects and other objects, a data archiving controller is in communication with a main storage device and a backing storage device for controlling archiving of data between the main storage device and the backing storage device. The data archiving controller is a fuzzy logic control device having a set allocating apparatus in communication with the main storage device and the backing storage devices to receive retention device usage parameters from the main storage device and the backing storage devices. The set allocating apparatus evaluates the retention device usage parameters, and then classifies the retention device usage parameters within classification sets. A membership rules retaining device is in communication with the set allocating apparatus to maintain classification parameter defining rules by which the retention device usage parameters are assigned to the classification sets.

The archiving controller has a rule evaluation apparatus in communication with the set allocating apparatus to determine a quantity of data to be archived between the main storage devices and backing storage devices. The quantity of data to be archived is based on evaluation rules determined by the classification sets. A data designation apparatus is in communication with the rule evaluation device, the main storage device, and backing storage devices to designate a number of files to be archived. From the number of files designated to be transferred, the data designation apparatus determines, which files are to be transferred between the main storage device and backing storage devices.

The retention device usage parameters are a data occupation ratio and a data occupation quota respectively for the main storage device and backing storage devices. The data occupation ratio is a percentage of the main storage device and/or backing storage devices occupied with data. A main storage device classification set places the data occupation ratio into one of a plurality of classes of the main storage device classification set. The data occupation quota is an amount of the main storage device and/or backing storage devices allocated for the archiving of data. A second classification set places the data occupation quota into one of a plurality of classes of the second classification set. The first and second classification sets are fuzzy sets with the retention device usage parameters having membership in multiple classification sets.

The quantity of data to be transferred from the main storage device to the backing storage device is determined by the formula:

$$s^* = \frac{\int sB(s)ds}{\int B(s)ds}$$

Where:
  s* is the evaluated quantity of data,
  s is the quantity of data as determined by mapping the classification sets with the evaluation rules,
  B(s) is a membership function for the quantity of data s.

The number of files to transferred between the main storage device and backing storage devices is determined by the formula:

$$f = \frac{s^* n}{c}$$

Where:
  f is the number of files to be transferred between the main storage device and backing storage devices,
  n is a constant parameter,
  c is an average file size present on the main storage device and/or second data retention device.

The designation of files to be transferred between the main storage device and backing storage devices are chosen according to------

BRIEF DESCRIPTION OF THE DRAWINGS

FIG. 1 is a computing system having a main mass disk storage and a backing mass disk storage of the prior art.

FIG. 2 is a computing system having a main mass disk storage and a backing mass disk storage with a fuzzy logic archiving controller of this invention.

DETAILED DESCRIPTION OF THE INVENTION

Figure 3:
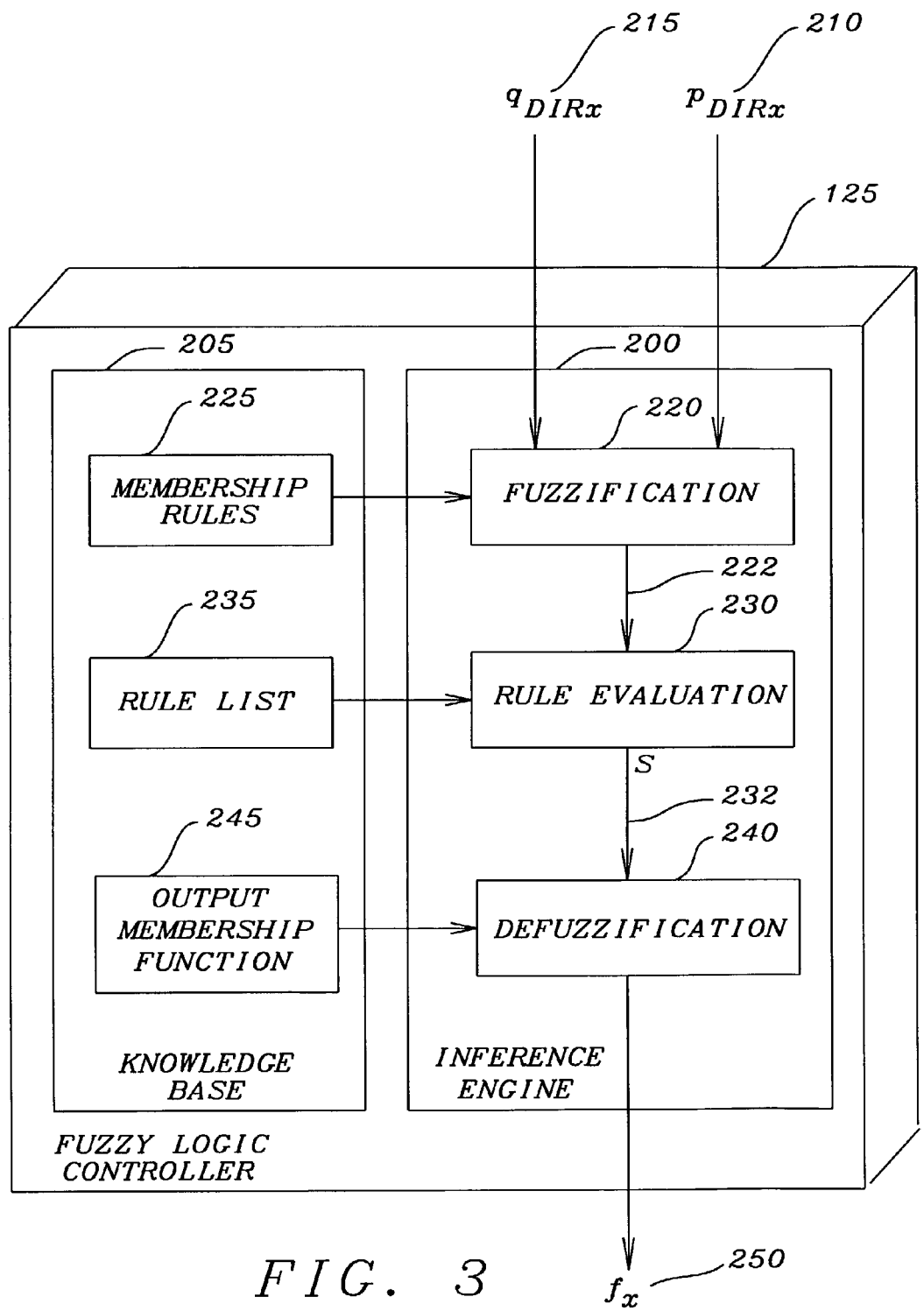
FIG. 3 is a block diagram of a fuzzy logic archiving controller of this invention.

As is known in the art and explained in HCS12 V1.5 Core—User Guide, Version 1.2, Document Number S12CPU15UG/D, August 2000, Motorola, Inc., pp. 503–530, Appendix B, fuzzy logic provides for definitions of sets that have indistinct boundaries rather than the crisp boundaries of Aristotelian logic. The sets can overlap so that, for a particular input value, one or more sets may be true at the same time. As the input varies out of the range of one set and into the range of an adjacent set, the first set becomes progressively less true while the second set becomes progressively more true. Fuzzy sets are a means of using linguistic expressions such as "temperature is warm" as labels in rules that can be evaluated with a high degree of numerical precision and repeatability. A specific set of input conditions always produces the same result, just as a conventional control system does.

A fuzzy logic control system has two parts:
  A fuzzy inference kernel, which is executed periodically to determine system outputs based on current system, inputs.
  A knowledge base, which contains membership functions and rules.

Membership functions are simply expressions of an understanding of the linguistic terms that describe the system to be controlled. Rules are ordinary language statements that describe the actions to be taken to solve the application problem. Rules and membership functions can be reduced to relatively simple data structures (the knowledge base) stored in memory.

The initial step executed by the inference kernel is the fuzzification step or allocation of the current system input values to the membership sets or functions. The current system input values are compared to stored input membership functions to determine the degree to which each label of each system input is true. Rule evaluation processes a list of rules from the knowledge base using current input values as allocated by the membership rules to produce a list of outputs, can be thought of as raw suggestions for what the system output should be in response to the current input conditions. Before the results can be applied, the fuzzy outputs must be further processed or evaluated to produce a single output value that represents the combined effect of all of the potential outputs.

The computer system of this invention has a main processor or server 110 connected to a group of main storage disks 120a, 120b, . . . , 120n. A fuzzy logic archiving controller 125 is connected between the main processor 110 and the backing store controller 130. The backing store controller 130 is connected to the backing storage disks 135. Periodically, the fuzzy logic archiving controller queries the disk usage ratio of the main storage disks 120a, 120b, . . . , 120n. The disk usage ratio is a device usage parameter of the main storage disks 120a, 120b, . . . , 120n describing the percentage of the main storage disks 120a, 120b, . . . , 120n occupied by current data files. When one of the main storage disks 120a, 120b, . . . , 120n has exceeded the disk usage ratio limit, the fuzzy logic archiving controller then queries the backing storage controller to determine if one of the directories assigned to the user-owner of the main storage disk 120a, 120b, . . . , 120n having exceeded the disk usage ratio has not exceed its allotted disk space. If it has the fuzzy logic archiving controller informs the user-owner that another directory of the backing storage disks 135 needs to be assigned to the user owner to accommodate any archiving of data from the main storage disks 120a, 120b, . . . , 120n. Alternately, the present directory of the user-owner may be increased in size to accept the data to be archived.

Once sufficient space within the directory of the backing storage disk 135 is available, the fuzzy logic archiving controller 130 then allocates the disk usage ratio of the main storage disk 120a, 120b, . . . , 120n having exceeded the maximum usage ratio to a classification set according to a set of fuzzy membership rules. The fuzzy logic archiving controller 125 then allocates the amount of space available within the directory of the backing storage disk 135 to a second classification set according to a second set of membership rules. The fuzzy logic archiving controller 125 then evaluates the two set of classification sets to determine an output set indicative of the quantity of disk space of the main storage disks 120a, 120b, . . . , 120n to be transferred to the backing storage disks 135. This amount of space to be transferred is then translated by the fuzzy logic archiving controller 125 to a number of files to be transferred. The number of files to be transferred is communicated to the main processor 110, which then determines which files are to be transferred and transmits the files to the backing store controller 130 for placement within the backing storage disks 135.

Refer now to FIG. 3 for a discussion of the structure and function of the fuzzy logic archiving controller 125 of this invention. The fuzzy logic archiving controller 125 has an inference engine 200 that determines from the inputs 210 and 215 the output signal 250 by use of the constructs of fuzzy logic as described above. In the preferred embodiment the inputs ($p_{DISKx}$) 210 and ($q_{DIRx}$) 215 are respectively the percentage ratio of the amount of space occupied by data files on the main storage disks 120a, 120b, . . . , 120n to the amount of space available on the main storage disks 120a, 120b, . . . , 120n and the amount of space assigned to the user-owner on the backing storage disk 135. The output signal ($f_x$) 250 is the number of files to be transferred from the main storage disk 120a, 120b, . . . , 120n to the backing storage disk 135.

The inference engine has a "fuzzification" unit 220, which receives the input signals 210 and 215 and assigns the input signals 210 and 215 membership within classification sets. The membership rules 225 are maintained within the knowledge base 205 and conveyed to the fuzzificaton unit 220.

Figures 4, 5:
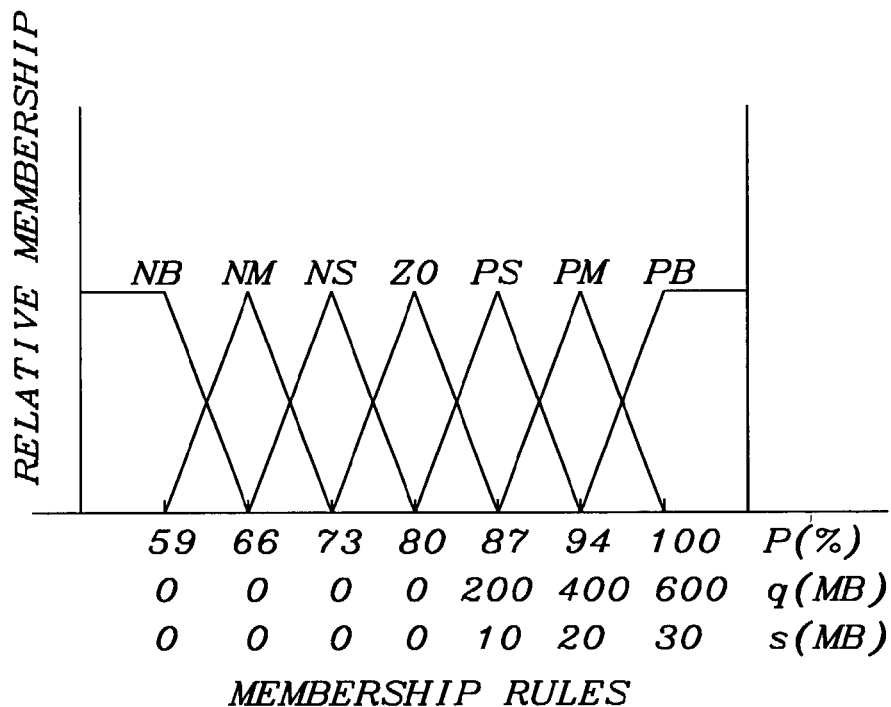
FIG. 4 is a diagram of the membership rules of the fuzzy logic archiving controller of this invention.
FIG. 5 is diagram of the evaluation rule list of the fuzzy logic archiving controller of this invention.

Refer now to FIG. 4 for a discussion of the membership rules for the input signals 210 and 215. The percentage ratio ($p_{DISKx}$) 210 of data within the main storage disk 120a, 120b, . . . , 120n is divided into a set of classes. These classes are the relative amount of data as compared with a usage ratio limit. The classes are:

| CLASS | RANGE $p_{DISKx}$ |
| --- | --- |
| Negative Big (NB) | 0–66% |
| Negative Medium (NM) | 59–73% |
| Negative Small (NS) | 66–80% |
| Zero Deviation (Z0) | 73–87% |
| Positive Small (PS) | 80–94% |
| Positive Medium (PM) | 87–100% |
| Positive Big (PB) | >94% |

Each classification is a triangular function such that the sum of the relative memberships of the classification sets is equal to 100%.

The quantity ($q_{DIRx}$) 215 of the designated directory of the backing storage disk 135 is allocated to the classification sets as follows:

| CLASS | RANGE $q_{DIRx}$ |
| --- | --- |
| Negative Big (NB) | 0 |
| Negative Medium (NM) | 0 |
| Negative Small (NS) | 0 |
| Zero Deviation (Z0) | 0–200 MB |
| Positive Small (PS) | 0–400 MB |
| Positive Medium (PM) | 200 MB–600 MB |
| Positive Big (PB) | >400 MB |

Again each classification is a triangular function such that the sums of the relative memberships of the classification sets is equal to 100%.

The allocated classes are the outputs 222 of the fuzzification unit 220 and are the inputs to the rule evaluation unit 230. The rule evaluation unit determines the raw suggestions for the output of the system. The rule evaluation unit acquires the output membership rules and the mapping rules for the output as a function of the allocated classes from the rule list 235 of the knowledge base 205. The membership rules describe the output $s_x$ 232 as a relative quantity (MB) of data files to be removed from the main storage disk 120a, 120b, . . . , 120n. As shown in the FIG. 4 the outputs $s_x$ 232 are define as the membership classes as follows:

| CLASS | RANGE $q_{DIRx}$ |
| --- | --- |
| Negative Big (NB) | 0 |
| Negative Medium (NM) | 0 |
| Negative Small (NS) | 0 |
| Zero Deviation (Z0) | 0–10 MB |
| Positive Small (PS) | 0–20 MB |
| Positive Medium (PM) | 10 MB–30 MB |
| Positive Big (PB) | >20 MB |

Again each membership class has a triangular function such that the sum of the relative amounts is 100%.

The mapping rules for the input classes 222 to the output classes 232 are shown in the rule list of FIG. 5. Each class member 222 of the inputs 210 and 215 are mapped to provide the class assignment for the output s 232.

Figure 6:
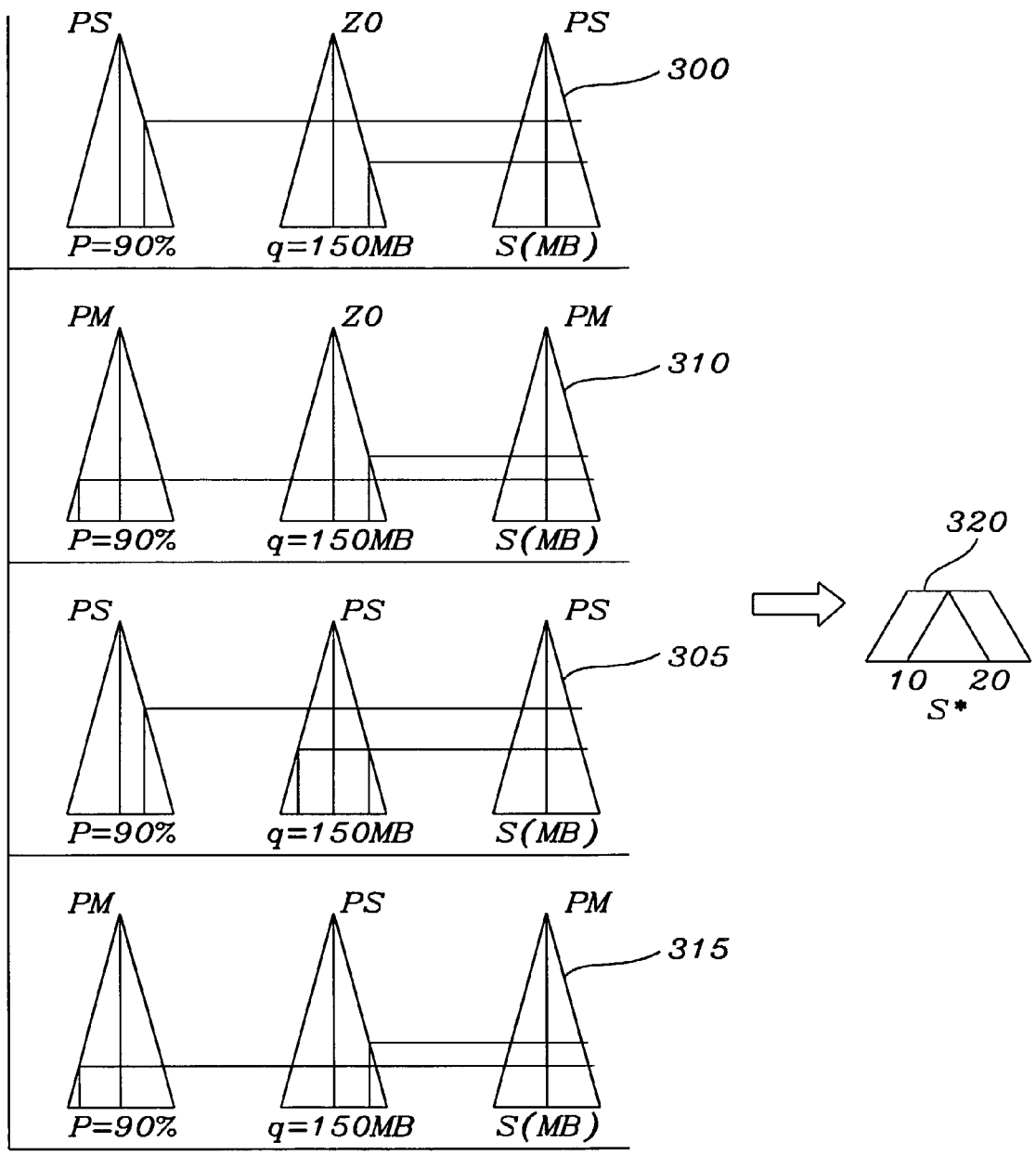
FIG. 6 is a plot of the mapping of an output variable during an evaluation of the membership rules of FIGS. 4 and 5 for an example of the operation of the fuzzy logic archiving controller of this invention.

Refer now to FIG. 6 for an example of the evaluation of the input variables $p_{DISKx}$ 210 and $q_{DIRx}$ 215 of FIG. 3. In this example the main storage disk 120*a*, 120*b*, ..., 120*n* is at a capacity of 90% of the total capacity. The directory allocation $q_{DIRx}$ to the user-owner of the backing storage 135 is 150 MB. The membership rules indicate that the input variable $p_{DISKx}$ occupies the classes positive small (PS) and positive medium (PM) and the input variable $q_{DIRx}$ occupies the classes Zero (ZO) and the positive small (PS). From the rule list of FIG. 5 the relative output quantity occupies the classes positive small (PS) 300 and 305 and the positive medium (PM) 310 and 315. The two classes are combined to form the total set 320 of possible outcomes s* of the rule evaluation.

The output s 232 of the rule evaluation unit 230 are the input of the defuzzification unit 240, which designates the number of files to be archived from the amount of space determined by the rule evaluation unit 230. The output membership function 245 within the knowledge base 205 determines the function used by the defuzzification unit 240 to evaluate the space determined by the rule evaluation unit 230. The amount of space s* required is calculated from the classes 320 of FIG. 6 by determining the center of mass of the trapezoid of the union of the classes. The center of mass is found by the function:

$$s^* = \frac{\int sB(s)ds}{\int B(s)ds}$$

Where:
s* is the evaluated quantity of data,
s is the quantity of data as determined by mapping the classification sets with the evaluation rules,
B(s) is a membership function for the quantity of data s The total number of files to be transferred is then determined by the formula:

$$f = \frac{s^*n}{c}$$

Where:
f is the number of files to be transferred between the main storage disk and the backing storage disks,
n is a constant parameter,
c is an average file size present on said main storage disk.

The output $f_x$ 250 of the defuzzification unit 240 is the output of the inference engine 250 and is transferred to the main processor 110 of FIG. 2. The main processor 110 determines which of the files are to be archived and then transfers these designated files from the main storage disk 120*a*, 120*b*, ..., 120*n* to the backing storage disks 135.

Returning to FIG. 2, as is apparent to those skilled in the art, the fuzzy logic controller 125 and the backing storage controller 130 may be incorporated within the main processor 110 or maybe components of a network of computer systems. Further the fuzzy logic controller 125 maybe a program executed by the main processor 110. The program executing the function of the logic controller 125 is stored as program code on a program retention device such as magnetic or optical storage media, random access memory, or within storage nodes of a network of computing systems.

Figure 7:
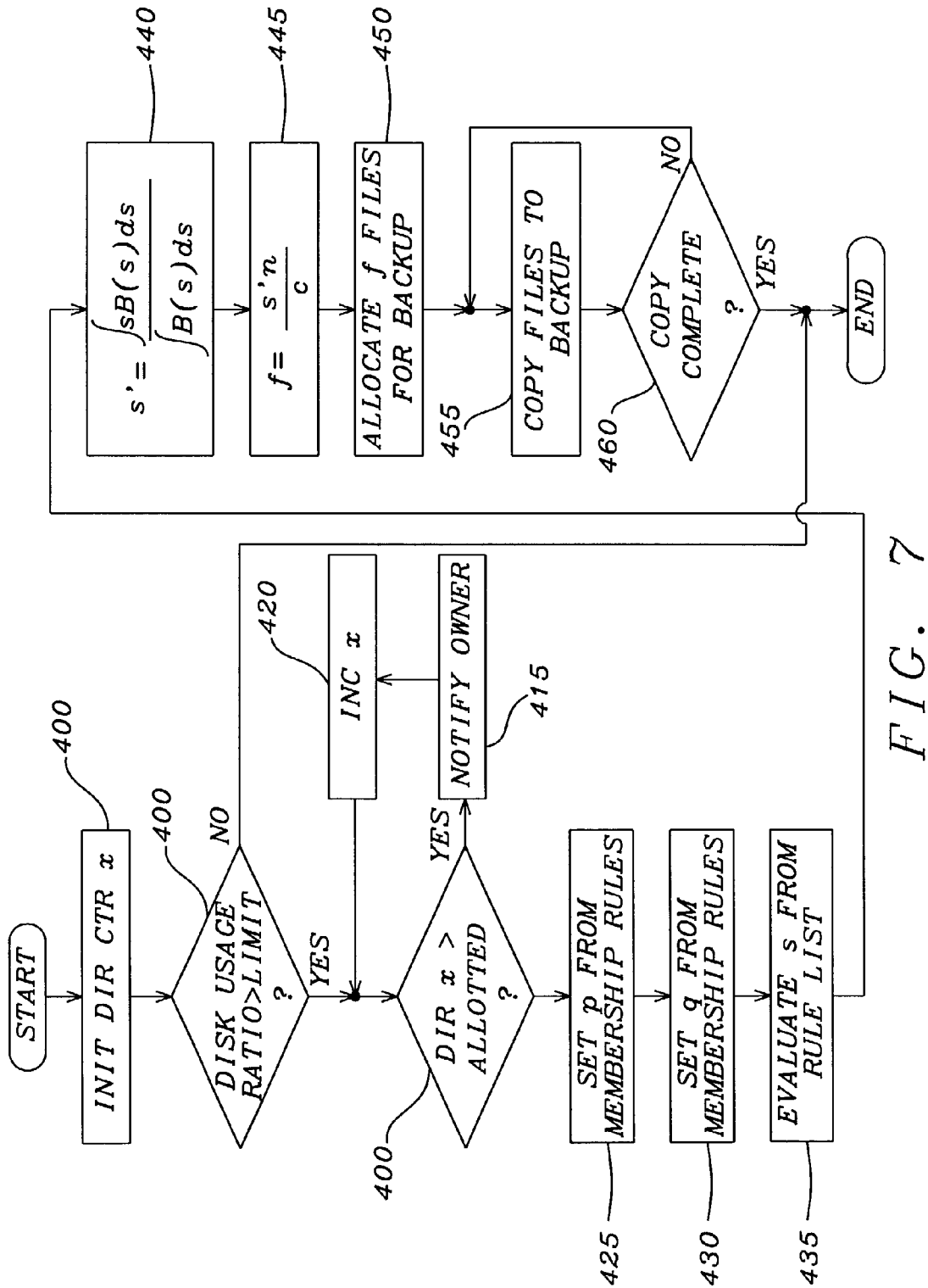
FIG. 7 is process flow diagram of a method for controlling archiving of data between a main mass disk storage device and a backing mass disk storage device.

The program of this invention executes a method or process for controlling archiving of data between a main storage disk and a backing storage disk as shown in FIG. 7.

A directory counter (Box 400) is initialized. The directory counter identifies those directories of the backing storage disks allocated for accepting the archived files of the main storage disk. The disk usage ratio of the main storage disk is compared (Box 405) with an established limit. If the usage limit has not been exceeded, the present iteration of the program is ended. However, if the usage limit of the main storage disk is exceeded, the directory pointed at by the counter pointer (x) is queried (Box 410) is determine if the directory is allocated sufficient space to contain any of the data to be archived. If the directory does not have sufficient space, the use-owner of the directory is notified (Box 415) that there is insufficient space within the directory and more space needs to be allocated to the directory. The directory counter is incremented (Box 420) to a next directory that is assigned to the user-owner. The directories are queried (Box 410) until a directory with sufficient space is available.

The usage ratio of the main storage disk and the quantity of space present in current directory of the backing storage disk are then allocated (Boxes 425 and 430) to membership in the fuzzy classification sets as described in FIG. 4. The membership classes are then evaluated (Box 435) according to the rules listing as described in FIG. 5 to determine the output membership function. The output membership function is used to calculate (Box 440) the amount of space s* required from the classes 320 of FIG. 6 by determining the center of mass of the trapezoid of the union of the classes. The center of mass is found by the function:

$$s^* = \frac{\int sB(s)ds}{\int B(s)ds}$$

Where:
s* is the evaluated quantity of data,
s is the quantity of data as determined by mapping the classification sets with the evaluation rules,
B(s) is a membership function for the quantity of data s.

The total number of files to be transferred is then determined (Box 445) by the formula:

$$f = \frac{s^*n}{c}$$

Where:
f is the number of files to be transferred between the main storage disk and the backing storage disks,
n is a constant parameter,
c is an average file size present on said main storage disk.

The number of files are then allocated (Box 450) and identified for backup. The identified files are then transferred (Box 455) from the main storage disks to the backing storage disks. The copying of the files is queried (Box 460) for completion and upon completion the program is finished for the present iteration.

The fuzzy logic archiving controller or the program executed to perform the function of archiving data files from a main storage disk to a backing storage disk maybe operated prior to a storage of a file to the main storage disk.

Alternately, the fuzzy logic archiving controller or the program executed to perform the function of archiving data files from a main storage disk to a backing storage disk at regular periodic intervals to maintain a usage ratio at an optimum level.

Figure 8:
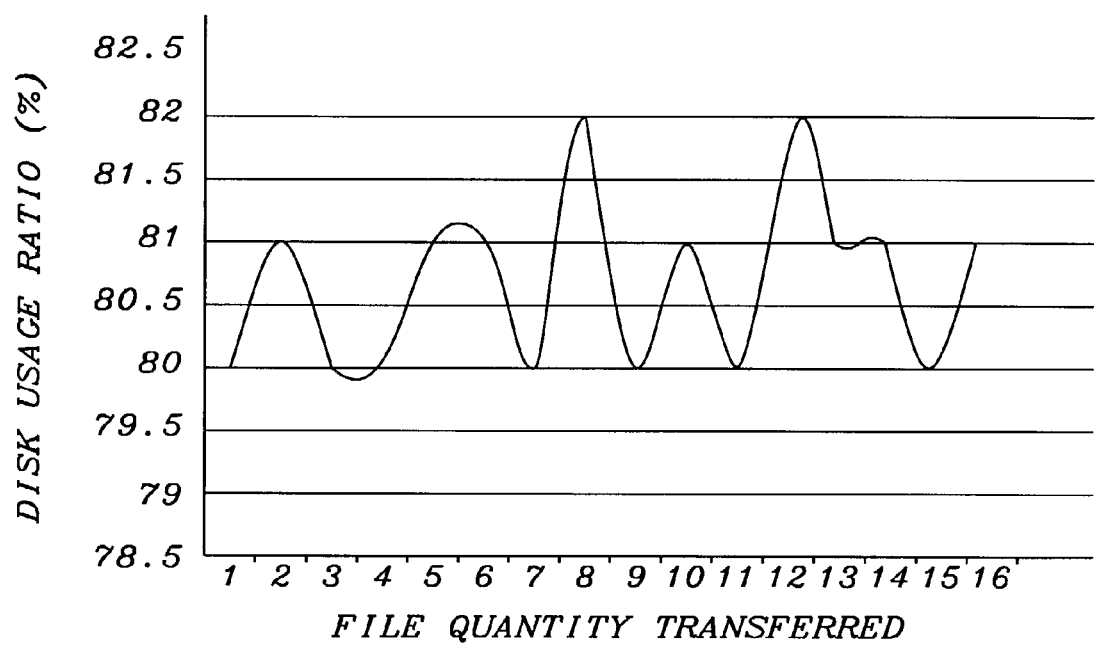
FIG. 8 is a plot of the quantity of files transferred versus a main mass disk storage device utilization ratio of this invention.

Referring to FIG. 8, the plot shows the disk usage ratio of the main storage disk versus the number of files transferred to the backing storage disk. As can be seen the usage ratio fluctuates at a level only slightly larger than the limit value set for the usage ratio. In the system of the prior art, the usage ratio would approach 100% and cause the system to cease operation until the user-owner manually transferred files to the backing storage disk. The user-owner would have to understand which files would be eligible for transfer and would have to manually determine the number of files to be transferred. In systems where large numbers of files are generated and maintained automatically, this knowledge of the file structure is complicated and difficult.

While this invention has been particularly shown and described with reference to the preferred embodiments thereof, it will be understood by those skilled in the art that various changes in form and details may be made without departing from the spirit and scope of the invention.

The invention claimed is:

1. A data archiving controller in communication with a first data retention device and a second data retention device for controlling archiving of data between the first data retention device and the second data retention device, said data archiving controller comprising:
   a set allocating apparatus in communication with the first and second data retention devices to receive retention device usage parameters from said first and second data retention devices, to evaluate said retention device usage parameters, and to classify said retention device usage parameters within classification sets;
   a membership rules retaining device in communication with said set allocating apparatus, said retaining device having classification parameters defining rules by which said retention device usage parameter are assigned to said classification sets;
   a rule evaluation apparatus in communication with the set allocating apparatus to determine a quantity of data to be archived between the first and second data retention devices based on evaluation rules determined by said classification sets; and
   a data designation apparatus in communication with the rule evaluation device and the first and second data retention devices to designate a number of files to be archived and from the number of files, which files are to be, transferred between the first and second data retention devices;
   wherein the classification sets are fuzzy sets with the retention device usage parameters having membership in multiple classification sets.

2. The data archiving controller of claim 1 wherein the retention device usage parameters comprise the data occupation ratio and a data occupation quota for the first and second data retention devices.

3. The data archiving controller of claim 2 wherein the data occupation ratio is a percentage of the first and/or second data retention devices occupied with data.

4. The data archiving controller of claim 3 wherein a first classification set places the data occupation ratio into one of a plurality of classes of said first classification set.

5. The data archiving controller of claim 2 wherein the data occupation quota is an amount of the first and/or second data retention devices allocated for said archiving of data.

6. The data archiving controller of claim 5 wherein a second classification set places the data occupation quota into one of a plurality of classes of said second classification set.

7. The data archiving controller of claim 1 wherein the first and second retention devices are storage devices.

8. The data archiving controller of claim 7 wherein the first retention device is a primary storage device for a computer system and the second retention device is an archival storage device, which receives excess data from the primary storage when a quantity of data resident within said primary storage exceeds a storage limit.

9. The data archiving controller of claim 1 wherein the quantity of data is determined by the formula:

$$s^* = \frac{\int sB(s)ds}{\int B(s)ds}$$

where s* is the evaluated quantity of data, s is the quantity of data as determined by mapping the classification sets with the evaluation rules, B(s) is a membership function for the quantity of data s.

10. The data archiving controller of claim 9 wherein the number of files to be transferred between the first and second data retention devices is determined by the formula:

$$f = \frac{s^*n}{c}$$

where f is the number of files to be transferred between the first and second data retention devices, n is a constant parameter, c is an average file size present on said first and/or second data retention device.

11. A computing system comprising:
   a data archiving controller in communication with a first and a second data retention device of said computing system for controlling archiving of data between the first data retention device and the second data retention device, said data archiving controller comprising:
      a set allocating apparatus in communication with the first and second data retention devices to receive retention device usage parameters from said first and second data retention devices, to evaluate said retention device usage parameters, and to classify said retention device usage parameters within classification sets;
      a membership rules retaining device in communication with said set allocating apparatus, said retaining device having classification parameters defining rules by which said retention device usage parameter are assigned to said classification sets;
      a rule evaluation apparatus in communication with the set allocating apparatus to determine a quantity of data to be archived between the first and second data retention devices based on evaluation rules determined by said classification sets; and
      a data designation apparatus in communication with the rule evaluation device and the first and second data retention devices to designate a number of files to be archived and from the number of files, which files are to be, transferred between the first and second data retention devices;

wherein the classification sets are fuzzy sets with the retention device usage parameters having membership in multiple classification sets.

12. The computing system of claim 11 wherein the retention device usage parameters comprise the data occupation ratio and a data occupation quota for the first and second data retention devices.

13. The computing system of claim 12 wherein the data occupation ratio is a percentage of the first and/or second data retention devices occupied with data.

14. The computing system of claim 13 wherein a first classification set places the data occupation ratio into one of a plurality of classes of said first classification set.

15. The computing system of claim 12 wherein the data occupation quota is an amount of the first and/or second data retention devices allocated for said archiving of data.

16. The computing system of claim 15 wherein a second classification set places the data occupation quota into one of a plurality of classes of said second classification set.

17. The computing system of claim 11 wherein the first and second retention devices are storage devices.

18. The computing system of claim 17 wherein the first retention device is a primary storage device for a computer system and the second retention device is an archival storage device, which receives excess data from the primary storage when a quantity of data resident within said primary storage exceeds a storage limit.

19. The computing system of claim 11 wherein the quantity of data is determined by the formula:

$$s^* = \frac{\int sB(s)ds}{\int B(s)ds}$$

where s* is the evaluated quantity of data, s is the quantity of data as determined by mapping the classification sets with the evaluation rules, B(s) is a membership function for the quantity of data s.

20. The computing system of claim 19 wherein the number of files to be transferred between the first and second data retention devices is determined by the formula:

$$f = \frac{s^*n}{c}$$

where f is the number of files to be transferred between the first and second data retention devices, n is a constant parameter, c is an average file size present on said first and/or second data retention device.

21. A method for controlling archiving of data between a first data retention device and a second data retention device, comprising the steps of:
allocating each of a plurality of data retention device usage parameters to at least one member of one of a plurality of data retention device usage classification sets;
evaluating said data retention device classification sets to define an output set indicating a quantity of data to be archived; and
determining a number of files to be archived from said output set;
wherein the classification sets are fuzzy sets with the retention device usage parameters having membership in multiple classification sets.

22. The method of claim 21 further comprising the step of: determining if one of said first and second data retention devices has exceeded a disk usage limit ratio.

23. The method of claim 21 further comprising the step of:
determining if a directory of the first and second data retention device into which said data is to be archived has sufficient space for receiving said data being archived;
if there is insufficient space within said directory, notifying a directory owner that said directory has insufficient space for archiving said data.

24. The method of claim 21 wherein the retention device usage parameters comprise the data occupation ratio and a data occupation quota for the first and second data retention devices.

25. The method of claim 24 wherein the data occupation ratio is a percentage of the first and/or second data retention devices occupied with data.

26. The method of claim 25 wherein a first classification set places the data occupation ratio into one of a plurality of classes of said first classification set.

27. The method of claim 24 wherein the data occupation quota is an amount of the first and/or second data retention devices allocated for said archiving of data.

28. The method of claim 27 wherein a second classification set places the data occupation quota into one of a plurality of classes of said second classification set.

29. The method of claim 21 wherein the first and second retention devices are storage devices.

30. The method of claim 29 wherein the first retention device is a primary storage device for a computer system and the second retention device is an archival storage device, which receives excess data from the primary storage when a quantity of data resident within said primary storage exceeds a storage limit.

31. The method of claim 21 wherein the quantity of data is determined by the formula:

$$s^* = \frac{\int sB(s)ds}{\int B(s)ds}$$

where s* is the evaluated quantity of data, s is the quantity of data as determined by mapping the classification sets with the evaluation rules, B(s) is a membership function for the quantity of data s.

32. The method of claim 31 wherein the number of files to be transferred between the first and second data retention devices is determined by the formula:

$$f = \frac{s^*n}{c}$$

where f is the number of files to be transferred between the first and second data retention devices, n is a constant parameter, c is an average file size present on said first and/or second data retention device.

33. An apparatus for controlling archiving of data between a first data retention device and a second data retention device, comprising the steps of: means for allocating each of a plurality of data retention device usage parameters to at least one member of one of a plurality of data retention device usage classification sets;

means for evaluating said data retention device classification sets to define an output set indicating a quantity of data to be archived; and means for determining a number of files to be archived from said output set;

wherein the classification sets are fuzzy sets with the retention device usage parameters having membership in multiple classification sets.

34. The apparatus of claim 33 further comprising: means for determining if one of said first and second data retention devices has exceeded a disk usage limit ratio.

35. The apparatus of claim 33 further comprising means for determining if a directory of the first and second data retention device into which said data is to be archived has sufficient space for receiving said data being archived;

means for notifying a directory owner that said directory has insufficient space for archiving said data, if there is insufficient space within said directory.

36. The apparatus of claim 33 wherein the retention device usage parameters comprise the data occupation ratio and a data occupation quota for the first and second data retention devices.

37. The apparatus of claim 36 wherein the data occupation ratio is a percentage of the first and/or second data retention devices occupied with data.

38. The apparatus of claim 37 wherein a first classification set places the data occupation ratio into one of a plurality of classes of said first classification set.

39. The apparatus of claim 36 wherein the data occupation quota is an amount of the first and/or second data retention devices allocated for said archiving of data.

40. The apparatus of claim 39 wherein a second classification set places the data occupation quota into one of a plurality of classes of said second classification set.

41. The apparatus of claim 33 wherein the first and second retention devices are storage devices.

42. The apparatus of claim 41 wherein the first retention device is a primary storage device for a computer system and the second retention device is an archival storage device, which receives excess data from the primary storage when a quantity of data resident within said primary storage exceeds a storage limit.

43. The apparatus of claim 33 wherein the quantity of data is determined by the formula:

$$s^* = \frac{\int sB(s)ds}{\int B(s)ds}$$

where s* is the evaluated quantity of data, s is the quantity of data as determined by mapping the classification sets with the evaluation rules, B(s) is a membership function for the quantity of data s.

44. The apparatus of claim 43 wherein the number of files to be transferred between the first and second data retention devices is determined by the formula:

$$f = \frac{s^* n}{c}$$

where f is the number of files to be transferred between the first and second data retention devices, n is a constant parameter, c is an average file size present on said first and/or second data retention device.

45. A computer-readable medium for retaining a computer program which, when executed on a computing system, executes a process for controlling archiving of data between a first data retention device and a second data retention device, comprising the steps of:

allocating each of a plurality of data retention device usage parameters to at least one member of one of a plurality of data retention device usage classification sets;

evaluating said data retention device classification sets to define an output set indicating a quantity of data to be archived; and determining a number of files to be archived from said output set;

wherein the classification sets are fuzzy sets with the retention device usage parameters having membership in multiple classification sets.

46. The computer-readable medium for retaining the computer program of claim 45 wherein the process further comprises the step of: determining if one of said first and second data retention devices has exceeded a disk usage limit ratio.

47. The computer-readable medium for retaining the computer program of claim 45 wherein the process further comprises the step of:

determining if a directory of the first and second data retention device into which said data is to be archived has sufficient space for receiving said data being archived;

if there is insufficient space within said directory, notifying a directory owner that said directory has insufficient space for archiving said data.

48. The computer-readable medium for retaining the computer program of claim 45 wherein the retention device usage parameters comprise the data occupation ratio and a data occupation quota for the first and second data retention devices.

49. The computer-readable medium for retaining the computer program of claim 48 wherein the data occupation ratio is a percentage of the first and/or second data retention devices occupied with data.

50. The computer-readable medium for retaining the computer program of claim 49 wherein a first classification set places the data occupation ratio into one of a plurality of classes of said first classification set.

51. The computer-readable medium for retaining the computer program of claim 48 wherein the data occupation quota is an amount of the first and/or second data retention devices allocated for said archiving of data.

52. The computer-readable medium for retaining the computer program of claim 51 wherein a second classification set places the data occupation quota into one of a plurality of classes of said second classification set.

53. The computer-readable medium for retaining the computer program of claim 45 wherein the first and second retention devices are storage devices.

54. The computer-readable medium for retaining the computer program of claim 53 wherein the first retention device is a primary storage device for a computer system and the second retention device is an archival storage device, which receives excess data from the primary storage when a quantity of data resident within said primary storage exceeds a storage limit.

55. The computer-readable medium for retaining the computer program of claim 54 wherein the quantity of data is determined by the formula:

$$s^* = \frac{\int sB(s)ds}{\int B(s)ds}$$

where s* is the evaluated quantity of data, s is the quantity of data as determined by mapping the classification sets with the evaluation rules, B(s) is a membership function for the quantity of data s.

56. The computer-readable medium for retaining the computer program of claim 55 wherein the number of files to be transferred between the first and second data retention devices is determined by the formula:

$$f = \frac{s^* n}{c}$$

where f is the number of files to be transferred between the first and second data retention devices, n is a constant parameter, c is an average file size present on said first and/or second data retention device.

* * * * *